United States Patent
Hanus et al.

(10) Patent No.: US 12,500,533 B2
(45) Date of Patent: Dec. 16, 2025

(54) DUAL-CHANNEL, POSITION SENSOR FOR ELECTROMECHANICAL ACTUATOR CONTROLLER WITH BACKUP CONTROL LANE

(71) Applicant: HONEYWELL INTERNATIONAL INC., Charlotte, NC (US)

(72) Inventors: Petr Hanus, Brno (CZ); Michal Jasansky, Brno (CZ); Darrell W. Horner, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 156 days.

(21) Appl. No.: 18/401,904

(22) Filed: Jan. 2, 2024

(65) Prior Publication Data

US 2025/0219556 A1 Jul. 3, 2025

(51) Int. Cl.
H02P 6/16 (2016.01)
B64C 13/50 (2006.01)

(52) U.S. Cl.
CPC ............. *H02P 6/16* (2013.01); *B64C 13/503* (2013.01)

(58) Field of Classification Search
CPC ....... H02P 6/16; B64C 13/503; B64C 13/505; G05B 9/03
See application file for complete search history.

(56) References Cited

U.S. PATENT DOCUMENTS

| | | | |
|---|---|---|---|
| 7,984,878 B2 | 7/2011 | Hirvonen | |
| 8,177,308 B2 | 5/2012 | Ralea | |
| 8,690,101 B2 | 4/2014 | Ahmad et al. | |
| 8,935,015 B2 | 1/2015 | Olsoe et al. | |
| 9,533,751 B2 | 1/2017 | Lin et al. | |

(Continued)

FOREIGN PATENT DOCUMENTS

| | | | |
|---|---|---|---|
| CN | 104787311 A | 7/2015 | |
| CN | 113504720 A | 10/2021 | |

(Continued)

OTHER PUBLICATIONS

Ripel, Tomas; Durando, Alessandro; Vadlejch, Filip; Weisman, Andrej; Korf, Jaroslav; Hanus, Petr; Skarolek, Antonin, Development of Fault Tolerant Electro-Mechanical Actuation System for Ailerons of Regional Aircraft, Mar. 15, 2021.

(Continued)

*Primary Examiner* — Bickey Dhakal
(74) *Attorney, Agent, or Firm* — Ingrassia Fisher & Lorenz LLP (57) ABSTRACT

A system configuration significantly reduces the number of interconnections needed between an electromechanical actuator (EMA) and an EMA controller (EMAC) while maintaining redundancy and other safety aspects needed by the target application without adding second or third independent redundant position sensors to the EMA for use with backup channel of the controller. The system configuration extends the sensor architecture used by COM-COM controllers with an additional sensor channel used by a backup controller without the need for adding a separate physical position sensor for the backup controller, which saves implementation effort, space, and weight that would otherwise be needed for integration of additional redundant sensors into the EMA.

20 Claims, 3 Drawing Sheets

(56) References Cited

U.S. PATENT DOCUMENTS

| | | |
|---|---|---|
| 9,950,785 B2 | 4/2018 | Onfroy et al. |
| 10,023,303 B2 | 7/2018 | Moutaux et al. |
| 10,061,313 B2 | 8/2018 | Letwin et al. |
| 10,309,342 B2 * | 6/2019 | Mueller .................. F02C 9/00 |
| 10,730,609 B2 | 8/2020 | Baran et al. |
| 10,843,792 B2 | 11/2020 | Avritch et al. |
| 11,099,936 B2 | 8/2021 | Galvão et al. |
| 11,702,192 B2 | 7/2023 | Auerbach et al. |
| 2011/0248121 A1 | 10/2011 | Hirvonen |
| 2021/0262399 A1* | 8/2021 | Thorup .................. F02C 9/26 |
| 2021/0300526 A1 | 9/2021 | Ricci Moretti |
| 2023/0227174 A1 | 7/2023 | Cadotte et al. |
| 2023/0291336 A1 | 9/2023 | Horner et al. |

FOREIGN PATENT DOCUMENTS

| | | | |
|---|---|---|---|
| CN | 113534655 A | 10/2021 | |
| EP | 1932762 A2 * | 6/2008 | ............. H02K 7/025 |
| WO | 2023035497 A1 | 3/2023 | |

OTHER PUBLICATIONS

Fawaz Yahya Annaz 1,* and Malaka Miyuranga Kaluarachchi 2, Progress in Redundant Electromechanical Actuators for Aerospace Applications, Sep. 7, 2023.

Mohamed A. A. Ismail 1,*, Simon Wiedemann 2, Colin Bosch 3 and Christoph Stuckmann, Design and Evaluation of Fault-Tolerant Electro-Mechanical Actuators for Flight Controls of Unmanned Aerial Vehicles, Jul. 25, 2021.

Hai-Tao Qi 1,2,* , Dong-Ao Zhao 2, Duo Liu 2 and Xu Liu, Double Redundancy Electro-Hydrostatic Actuator Fault Diagnosis Method Based on Progressive Fault Diagnosis Method, Sep. 13, 2022.

Dy Wang1, D Q Li1, J Chen2 and S C Zheng, A Position Synchronization Control for Dual Redundant Electro-mechanical Actuation in Flight Control System, Dec. 31, 2019.

Guan Qiao1, Geng Liu1 , Zhenghong Shi2 , Yawen Wang3 , Shangjun Ma1 and Teik C Lim, A review of electromechanical actuators for More/All Electric aircraft systems, Dec. 31, 2018.

* cited by examiner

DUAL-CHANNEL, POSITION SENSOR FOR ELECTROMECHANICAL ACTUATOR CONTROLLER WITH BACKUP CONTROL LANE

TECHNICAL FIELD

The present disclosure relates to position sensing associated with electromechanical actuation systems, and more particularly to a dual-channel, high-integrity position sensor for an electromechanical actuator controller with a backup control lane.

BACKGROUND

Many modern aircraft, including Urban Air Mobility (UAM) vehicles and Vertical Takeoff and Landing (VTOL) vehicles, are equipped with electromechanical actuators (EMA) that are controlled by and electromechanical actuation controller (EMAC). The EMA typically includes one or more position sensors to provide position feedback to the EMAC for position control of the EMA. In the unlikely, yet postulated event of a failed EMA position sensor, erroneous actuation can result. Thus, for increased safety margin, some systems may require functional redundancy, which can be achieved by using multiple independent sensors. In such instances, the position sensor local bus is usually converted to an industry standard communication bus, such as RS422, RS485, BiSS or other suitable communication bus to reduce the number of interconnecting wires between the EMA and EMAC.

Although the position sensor itself is not considered a complex electronic device, the processing device between sensor local bus and the communication bus is often realized using complex electronic device such as MCU or PLD. When redundancy is implemented using similar complex electronic devices, these devices can be potentially susceptible to a common mode failure, which would result in the simultaneous loss of all the complex electronic devices. Redundancy must therefore be realized by using dissimilar complex electronic components, which can lead to increased cost, size, and weight.

Hence, there is a need to significantly reduce the number of interconnections between an EMA and EMAC, while maintaining redundancy, dissimilarity, and other safety-related aspects, without adding second or third independent redundant position sensors to the EMA for use with a backup channel of the controller. This disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an actuator control system includes a primary actuator controller, a backup actuator controller, and an actuator. The primary actuator controller is coupled to receive position command data that is indicative of a commanded position of a component and is configured, upon receipt of the position command data, to generate and supply actuator commands. The backup actuator controller is coupled to receive the position command data and is configured, upon receipt of the position command data, to selectively generate and supply the actuator commands. The actuator is in operable communication with the primary actuator controller and the backup actuator controller and is coupled to receive the actuator commands from one of the primary and backup actuator controllers. The actuator is configured, upon receipt of the actuator commands, to move a component to the commanded position and to supply feedback data to one of the primary and backup actuator controllers. The actuator includes an actuator motor moveable to a rotational motor position, an actuator output interface adapted to be coupled to a component and moveable to an actuator output position, a plurality of motor position sensors, a plurality of actuator output position sensors, a plurality of primary actuator processors, a plurality of primary actuator communication buses, a backup actuator processor, and a backup actuator communication bus. Each motor position sensor is configured to supply motor position data representative of the motor rotational position. Each actuator output position sensor is configured to supply actuator position data representative of the actuator output position. Each primary actuator processor is (i) in operable communication with, and is coupled to receive the motor position data from, a different one of the motor position sensors and (ii) in operable communication with, and is coupled to receive the actuator position data from, a different one of the actuator output position sensors. Each primary actuator processor is configured to at least process and combine the motor position data and the actuator position data it receives into a single primary sensor data packet. Each primary actuator communication bus is in operable communication with a different one of the primary actuator processors and with the primary actuator controller. Each primary actuator communication bus is configured to at least supply the single primary sensor data packet it receives to the primary actuator controller. The backup actuator processor is (i) in operable communication with, and coupled to receive the motor position data from, at least one of the motor position sensors and (ii) in operable communication with, and coupled to receive the actuator position data from, at least one of the actuator output position sensors. The backup actuator processor is configured to at least process and combine the motor position data and the actuator position data it receives into a single secondary sensor data packet. The backup actuator communication bus is in operable communication with the backup actuator processor and with the backup actuator controller. T the backup actuator communication bus is configured to at least supply the single secondary sensor data packet it receives to the backup actuator controller.

In another embodiment, an aircraft fly-by-wire flight control system includes a flight control inceptor, a flight control computer, a flight control surface actuator controller, and a flight control surface actuator. The flight control inceptor is configured to receive user input from a user and is configured, in response to the user input, to supply inceptor command data. The flight control computer is in operable communication with the flight control inceptor, is coupled to receive the inceptor command data from the flight control inceptor, and is configured, upon receipt of the inceptor data, to generate and supply flight control surface position command data. The flight control surface actuator controller is in operable communication with the flight control computer and includes a primary actuator controller and a backup actuator controller. The primary actuator controller is coupled to receive the flight control surface position command data and is configured, upon receipt of the flight control surface position command data, to generate and supply flight control surface actuator commands. The backup actuator controller is coupled to receive the flight control surface position command data and is configured, upon receipt of the flight control surface position command data, to selectively generate and supply flight control surface actuator commands. The flight control surface actuator is in operable communication with the flight control surface actuator controller. The flight control surface actuator is coupled to receive the flight control surface position commands from one of the primary and backup actuator controllers and is configured, upon receipt of the flight control surface position commands, to move a flight control surface to the commanded position and to supply feedback data to the flight control surface actuator controller. The flight control surface actuator includes an actuator motor moveable to a rotational motor position, an actuator output interface adapted to be coupled to a component and moveable to an actuator output position, a plurality of motor position sensors, a plurality of actuator output position sensors, a plurality of primary actuator processors, a plurality of primary actuator communication buses, a backup actuator processor, and a backup actuator communication bus. Each motor position sensor is configured to supply motor position data representative of the motor rotational position. Each actuator output position sensor is configured to supply actuator position data representative of the actuator output position. Each primary actuator processor is (i) in operable communication with, and is coupled to receive the motor position data from, a different one of the motor position sensors and (ii) in operable communication with, and is coupled to receive the actuator position data from, a different one of the actuator output position sensors. Each primary actuator processor is configured to at least process and combine the motor position data and the actuator position data it receives into a single primary sensor data packet. Each primary actuator communication bus is in operable communication with a different one of the primary actuator processors and with the primary actuator controller. Each primary actuator communication bus is configured to at least supply the single primary sensor data packet it receives to the primary actuator controller. The backup actuator processor is (i) in operable communication with, and coupled to receive the motor position data from, at least one of the motor position sensors and (ii) in operable communication with, and coupled to receive the actuator position data from, at least one of the actuator output position sensors. The backup actuator processor is configured to at least process and combine the motor position data and the actuator position data it receives into a single secondary sensor data packet. The backup actuator communication bus is in operable communication with the backup actuator processor and with the backup actuator controller. T the backup actuator communication bus is configured to at least supply the single secondary sensor data packet it receives to the backup actuator controller.

In yet another embodiment, an actuator control system includes a primary actuator controller, a backup actuator controller, and an actuator. The primary actuator controller is coupled to receive position command data that is indicative of a commanded position of a component and includes a command processor and a monitor processor. The command processor is configured to process the position command data to thereby generate and supply actuator commands. The monitor processor is configured to monitor the operability of the command processor. The backup actuator controller is coupled to receive the position command data and is configured, upon receipt of the position command data, to selectively generate and supply the actuator commands. The actuator is in operable communication with the primary actuator controller and the backup actuator controller and is coupled to receive the actuator commands from one of the primary and backup actuator controllers. The actuator is configured, upon receipt of the actuator commands, to move the component to the commanded position and to supply feedback data to one of the primary and backup actuator controllers. The actuator includes an actuator motor moveable to a rotational motor position, an actuator output interface adapted to be coupled to a component and moveable to an actuator output position, a plurality of motor position sensors, a plurality of actuator output position sensors, a plurality of primary actuator processors, a plurality of primary actuator communication buses, a backup actuator processor, and a backup actuator communication bus. Each motor position sensor is configured to supply motor position data representative of the motor rotational position. Each actuator output position sensor is configured to supply actuator position data representative of the actuator output position. Each primary actuator processor is (i) in operable communication with, and is coupled to receive the motor position data from, a different one of the motor position sensors and (ii) in operable communication with, and is coupled to receive the actuator position data from, a different one of the actuator output position sensors. Each primary actuator processor is configured to at least process and combine the motor position data and the actuator position data it receives into a single primary sensor data packet. Each primary actuator communication bus is in operable communication with a different one of the primary actuator processors and with the primary actuator controller. Each primary actuator communication bus is configured to at least supply the single primary sensor data packet it receives to the primary actuator controller. The backup actuator processor is (i) in operable communication with, and coupled to receive the motor position data from, at least one of the motor position sensors and (ii) in operable communication with, and coupled to receive the actuator position data from, at least one of the actuator output position sensors. The backup actuator processor is configured to at least process and combine the motor position data and the actuator position data it receives into a single secondary sensor data packet. The backup actuator communication bus is in operable communication with the backup actuator processor and with the backup actuator controller. T the backup actuator communication bus is configured to at least supply the single secondary sensor data packet it receives to the backup actuator controller.

Furthermore, other desirable features and characteristics of the actuator control system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
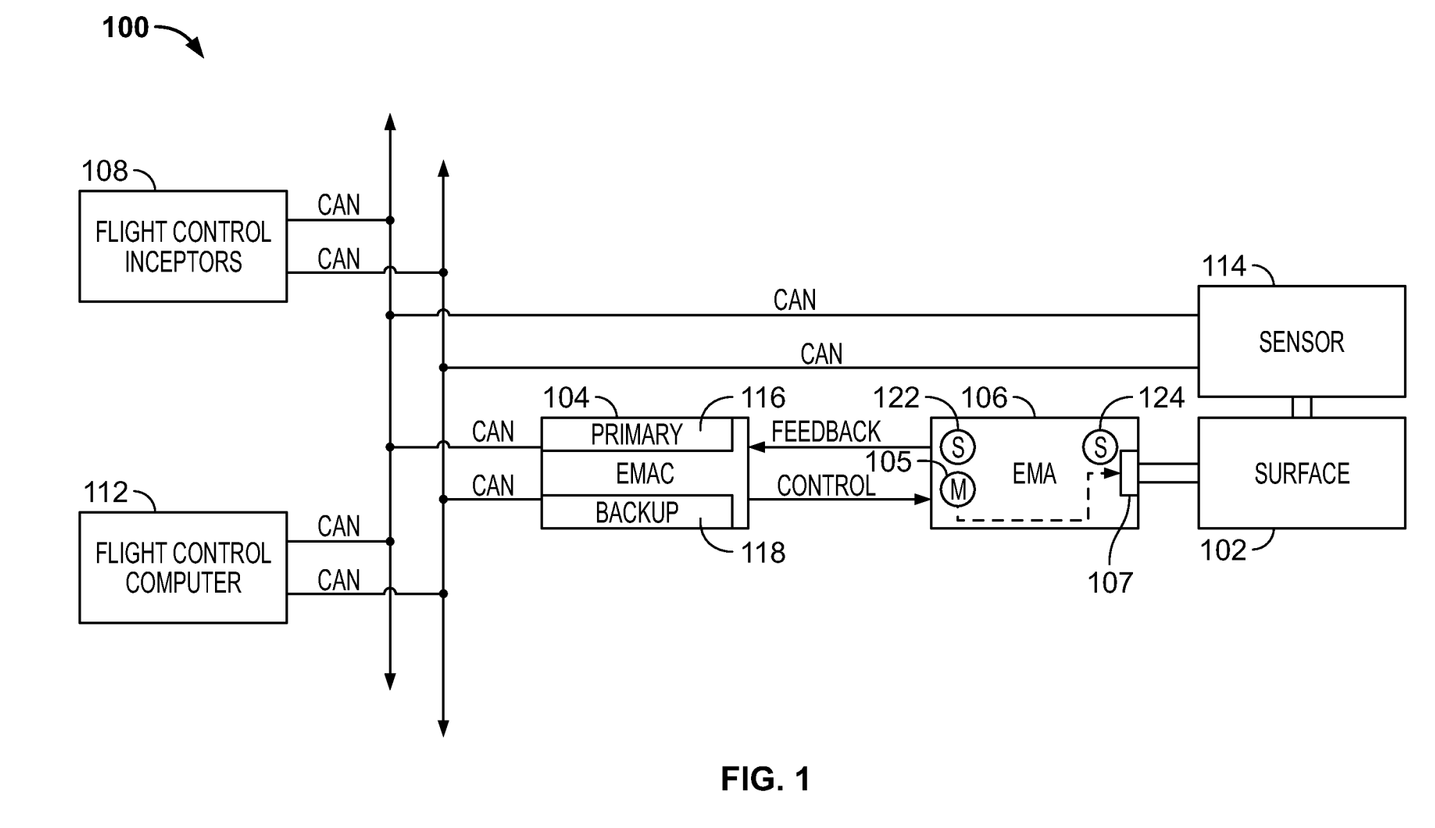
FIG. 1 depicts a functional block diagram of one embodiment of an aircraft fly-by-wire flight control system.

When system functional redundancy is required in flight critical systems, such redundancy may be provided either by multiple redundant control devices/systems (e.g., surfaces, engines, etc.) to achieve a given function, or by redundancy in the control of individual devices/systems, to meet industry standards. One example embodiment of an aircraft fly-by-wire flight control system 100 that provides suitable system functional redundancy is depicted in FIG. 1. It should be noted that, for simplicity, ease of illustration, and ease of description, the depicted system 100 is configured to control the position of a single flight control surface 102. It will be appreciated, however, that in other embodiments, such as the one described further below, the system 100 may be configured to control multiple flight control surfaces.

The depicted system 100 includes at least a flight control surface actuator controller 104, at least one flight control surface actuator 106, one or more flight control inceptors 108, at least one flight control computer 112, and at least one digital surface position sensor 114. As just noted, to prevent loss of control, system functional redundancy is required. In the embodiment depicted in FIG. 1, redundancy is implemented within the actuator controller 104. That is, the actuator controller 104 includes a primary actuator controller 116 and a backup actuator controller 118.

The primary flight control surface actuator controller 116 is coupled to receive, from at least one flight control computer 112, flight control surface position command data that is indicative of a commanded position of the flight control surface 102. The primary flight control surface actuator controller 104 is configured, upon receipt of the flight control surface position command data, to generate and supply flight control surface actuator commands to the flight control surface actuator 106.

The backup flight control surface actuator controller 118 is also coupled to receive the position command data from at least one flight control computer 112. However, the backup flight control surface actuation controller 118 is configured, upon receipt of the position command data, to only selectively generate and supply the flight control surface actuator commands to the flight control surface actuator 106. More specifically, the backup flight control surface actuator controller 118 is configured to supply the flight control surface actuator commands only in the unlikely, yet postulated event of a single-point failure occurring in the primary flight control surface actuator controller 116.

The flight control surface actuator(s) 106 is in operable communication with, and is coupled to receive the flight control surface actuator commands from, the flight control surface actuator controller 104. More specifically, the flight control surface actuator(s) 106 is coupled to receive the actuator commands from either the primary flight control surface actuator controller 116 or the backup flight control surface actuator controller 118. As may be appreciated, the flight control surface actuator(s) 106 will normally receive the flight control surface actuator commands from the primary flight control surface actuator controller 116 and, as alluded to above, will only receive the flight control surface actuator commands from the backup flight control surface actuator controller 118 in the unlikely, yet postulated event of a single-point failure occurring in the primary flight control surface actuator controller 116.

Regardless of the source of the flight control surface actuator commands, the flight control surface actuator(s) 106 is configured, upon receipt of the flight control surface actuator commands, to move the flight control surface 102 to the commanded position. It will be appreciated that the flight control surface actuator(s) 106 may be implemented using any one of numerous known actuators, but in the depicted embodiment it is implemented using an electromechanical actuator (EMA), which includes, for example, an actuator motor 105 that is moveable to a rotational position, and an actuator output interface 107 that is coupled to the motor 105 and is adapted to be coupled to a component, such as the flight control surface 102, and is moveable to an actuator output position. One specific example of a suitable electromechanical actuator is, for example, a motor-driven ball screw actuator. As FIG. 1 also depicts, and as will be described in more detail below, the flight control surface actuator(s) 106 supplies feedback (e.g., position feedback) to the flight control surface actuator controller 104.

The flight control inceptor(s) 108 is in operable communication with the flight control surface actuator controller(s) and the flight control computer(s) 112. The flight control inceptor(s) 108 is configured to receive user input from a user (e.g., a pilot) and is configured, in response to the user input, to supply the inceptor command data to the flight control computer(s) 112. The flight control inceptor(s) 108 may be implemented as a yoke, a side stick, a collective, and/or a rudder pedal, just to name a few non-limiting examples.

The flight control computer(s) 112 is in operable communication with the flight control inceptor(s) 108 and the flight control surface actuator controller(s) 104. The flight control computer(s) 112 is coupled to receive the inceptor command data from the flight control inceptor(s) 108 and is configured, upon receipt of the inceptor data, to generate and supply the flight control surface position command data to the flight control surface actuator controller 104.

The surface position sensor(s) 114 is in operable communication with at least the flight control computer(s) 112. The surface position sensor(s) 114 is coupled to, and is configured to sense the position of, the aircraft flight control surface 102 and supply a position signal representative thereof to the flight control computer(s) 112.

As noted above, the flight control surface actuator(s) 106 supplies feedback (e.g., position feedback) to the flight control surface actuator controller 104. In the depicted embodiment, the position feedback is supplied from a plurality of motor/motor shaft position sensors 122 and a plurality of actuator output/output interface position sensors 124. Each motor/motor shaft position sensor 122 (referred to hereinafter as simply "motor position sensor") is configured to supply motor position data representative of the rotational position of the motor 105, and each actuator output/output interface position sensor 124 (referred to hereinafter as simply "actuator position sensor") is configured to supply actuator position data representative of the actuator output position.

Figure 2:
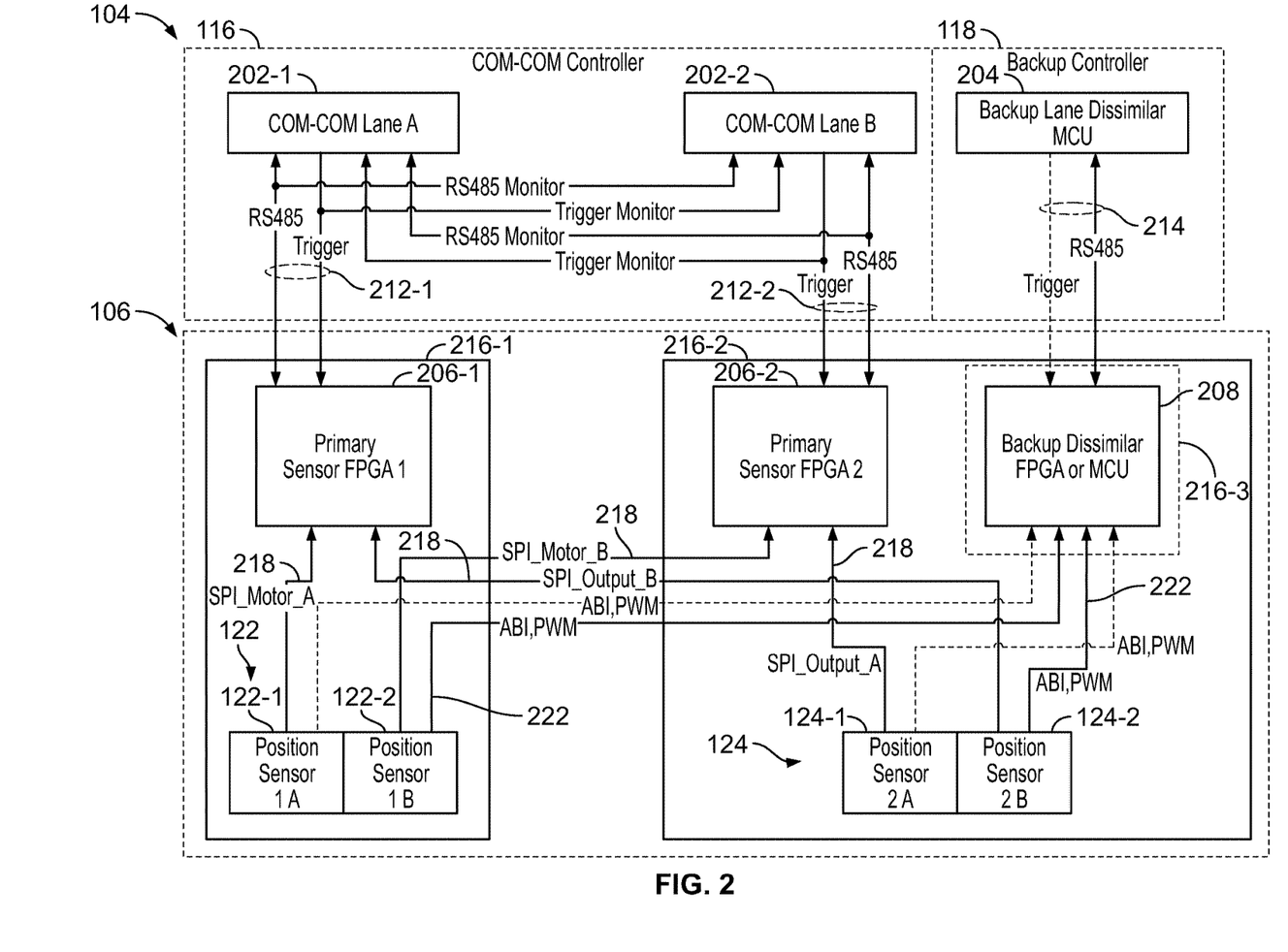
FIG. 2 depicts a functional block diagram of one embodiment of dual sensor architecture that may be implemented in the flight control surface actuator of FIG. 1.

Turning now to FIG. 2, it is seen that primary actuator controller 116 is configured to implement a simplified command-command (COM-COM) control architecture to provide high integrity actuator control and thus includes at least a first actuator control processor 202-1 and a second actuator control processor 202-2. This COM-COM control architecture is industry proven and has been used to drive an open wound brushless DC motor through two parallel gate drivers and inverters, as described in U.S. Pat. No. 8,084,972 (published as U.S. Patent Application Publication No. 2009/0128072), which is assigned to the Assignee of the instant application, and which is hereby incorporated by reference.

Before proceeding further, it is noted that the first and second actuator control processors 202-1, 202-2, which may also be referred to herein as COM-COM control processors, may be implemented using two separate, individual microcontrollers (as shown in FIG. 2) or as a single device embedded with dual controller cores that can operate independently or in lockstep manner. In either case, the first and second actuator control processors 202-1, 202-2 are preferably identical in design and software to reduce development costs. It is further noted that the backup actuator controller 118 is implemented using a dissimilar backup actuator control processor 204 (e.g., dissimilar microcontroller or FPGA) than is used in the primary actuator controller 116. This necessary to overcome a "common mode" failure of either the first and second actuator control processors 202-1, 202-2, which are classified as "complex" devices for certification purposes, where common mode loss of these devices would result in total loss of device control across the entire system 100 (potentially at the same time).

Returning to the description, and as FIG. 2 further depicts, the flight control surface actuator(s) 106 additionally includes a plurality of primary actuator processors 206 (e.g., 206-1, 206-2), a backup actuator processor 208, a plurality of primary actuator communication buses 212 (e.g., 212-1, 212-2), and a backup actuator communication bus 214. Each primary actuator processor 206 is in operable communication with, and is coupled to receive the motor position data from, a different one of the motor position sensors 122. Each primary actuator processor 206 is also in operable communication with, and is also coupled to receive the actuator position data from, a different one of the actuator output position sensors 124. Each of the primary actuator processors 206 is configured to at least process and combine the motor position data and the actuator position data it receives into a single primary sensor data packet.

The backup actuator processor 208 is in operable communication with, and is coupled to receive the motor position data from, at least one of the motor position sensors 122. The backup actuator processor 208 is also in operable communication with, and is also coupled to receive the actuator position data from, at least one of the actuator output position sensors 124. The backup actuator processor 208 is configured to at least process and combine the motor position data and the actuator position data it receives into a single secondary sensor data packet.

Each primary actuator communication bus 212 is in operable communication with a different one of the primary actuator processors 206 and with the primary actuator controller 116. Each primary actuator communication bus 212 is configured to at least supply the single primary sensor data packet it receives to the primary actuator controller 116. More specifically, the primary actuator communication buses 212, which are independent (and may be similar or dissimilar), each supply the single primary sensor data packet it receives to both of the first and second actuator control processors 202-1, 202-2.

The backup actuator communication bus 214 is in operable communication with the backup actuator processor 208 and with the backup actuator controller 118. The backup actuator communication bus 214 is configured to at least supply the single secondary sensor data packet it receives to the backup actuator controller 118, and more specifically to the backup actuator control processor 204.

In the depicted embodiment, it is seen that the plurality of motor position sensors 122 includes a first motor position sensor 122-1 and a second motor position sensor 122-2, the plurality of actuator position sensors 124 includes a first actuator position sensor 124-1 and a second actuator position sensor 124-2, the plurality of primary actuator processors 206 includes a first primary actuator processor 206-1 and a second primary actuator processor 206-2, and the plurality of primary actuator communication buses 212 includes a first primary communication bus 212-1 and a second primary actuator communication bus 212-2. It is further seen that, at least in the depicted embodiment, the first and second motor position sensors 122-1, 122-2 are disposed on a single die, as are the first and second actuator position sensors 124-1, 124-2. It will be appreciated, however, that in other embodiments, the first and second motor position sensors 122-1, 122-2 and/or the first and second actuator position sensors 124-1, 124-2 may be separately disposed. It will additionally be appreciated that the actuator(s) 106 may be implemented with more than this number of sensors 122, 124, primary actuator processors 206, and primary communication buses 212.

The first motor position sensor 122-1 is in operable communication with the first primary actuator processor 206-1, and the second motor position sensor 122-2 is in operable communication with the second primary actuator processor 206-2. The first actuator position sensor 124-1 is in operable communication with the first primary actuator processor 206-1, and the second actuator position sensor 124-2 is in operable communication with the second primary actuator processor 206-2. Moreover, in the depicted embodiment, the second motor position sensor 122-2 and the second actuator position sensor 124-2 are independently in operable communication with the backup actuator processor 208. It will be appreciated that in other embodiments, as illustrated using dashed lines in FIG. 2, the first motor position sensor 122-1 and/or the first actuator position sensor 124-1 may instead or also be independently in operable communication with the backup actuator processor 208.

Preferably, the first and second motor position sensors 122-1, 122-2 are independently in operable communication with the first and second primary actuator processors 206-1, 206-2, respectively, via a first type of sensor communication interface 218, and the first and second actuator position sensors 124-1, 124-2 are also independently in operable communication with the first and second primary actuator processors 206-1, 206-2, respectively, via the first type of sensor communication interface 218. In addition, the sensors that are in operable communication with the backup actuator processor 208, which in the depicted embodiment are the second motor position sensor 122-2 and the second actuator position sensor 124-2, are in operable communication via a second type of sensor communication interface 222. In the depicted embodiment, the first type of communication interface 218 is the SPI (serial peripheral interface) type, and the second type of communication interface 222 is the ABI (application binary interface) type or a PWM (pulse width modulation) type. It will be appreciated that various other types of communication interfaces may be used to implement the first and second types of communication interfaces.

In some embodiments, such as the one depicted in FIG. 2, the actuator(s) 106 may include two independent printed circuit board assemblies (PBAs) 216—a first PBA 216-1 and a second PBA 216-2. In such embodiments, the first PBA 216-1 has the first primary actuator processor 206-1, the first motor position sensor 122-1, and the second motor position sensor 122-2 mounted thereon, and the second PBA 216-2 has the second primary actuator processor 206-2, the first actuator position sensor 124-1, and the second actuator position sensor 124-2 mounted thereon. In the embodiment depicted in FIG. 2, the backup actuator processor 208 is also mounted on the second PBA 216-2, and is physically separate from the second primary actuator processor 206-2. It will be appreciated, however, that in other embodiments the backup actuator processor 208 may be mounted on the first PBA 216-1, and be physically separate from the first primary actuator processor 206-1, or it may be mounted on a completely separate PBA 216-3.

It should be noted that the primary and backup actuator communication buses 212, 214 can be implemented using any one of numerous types of communication buses. For example, the primary and backup actuator communication buses 212, 214 may be implemented using half duplex bidirectional buses, full duplex bidirectional buses, unidirectional buses with external trigger signals, or unidirectional buses without external trigger signals, just to name a few. The primary and backup actuator communication buses 212, 214 may also use any one of numerous robust communication protocols, such as RS485, RS422, BiSS, or any other suitable communication protocol, rather than using a sensor local bus that could potentially not be suitable for transmitting data over a long distance. As is known, in some instances the distance between a flight control surface actuator(s) 106 and its associated flight control surface actuator controller 116, 118 can vary from several inches to several feet. It is noted that, in those embodiments that rely on trigger signals, the trigger signals compensate for any delay that may be caused by translation of data from the sensor communication interfaces 218, 222 to the actuator communication buses 212, 214 (e.g., RS485 or similar communication bus). The actuator processors 206, 208 need to first receive complete data packages from the associated sensors 122, 124, via the sensor communication interfaces 218, 222. The actuator processors 206, 208 then need to translate the sensor data to the actuator communication buses 212, 214 (e.g., RS485 or similar communication bus) and transmit the data to the actuator controller 116, 118. This takes some time, but the delay caused by the conversion can be relatively easily calculated. The actuator controller 116, 118 usually knows when it would need fresh position data for control algorithm execution, so it can trigger reading the sensors 122, 124 in advance to have the data more precisely on time.

Figure 3:
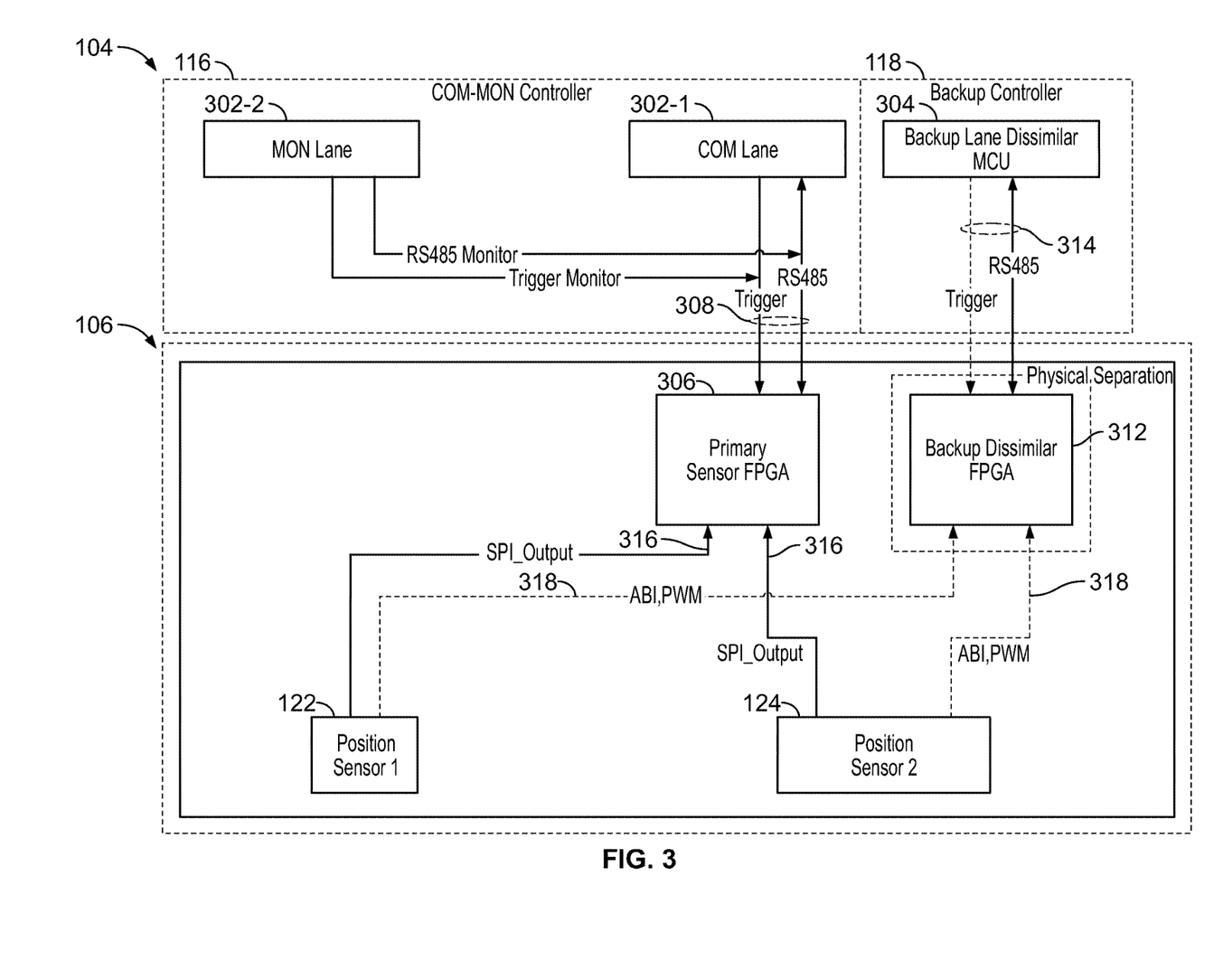
FIG. 3 depicts a functional block diagram of an embodiment of single sensor architecture that may be implemented in the flight control surface actuator of FIG. 1.

In some embodiments, of the aircraft fly-by-wire flight control system 100, the primary actuator controller 116 is configured to implement a command-monitor (COM-MON) control architecture. In these embodiments, as depicted in FIG. 3, the primary actuator controller 116 includes a command processor 302-1 and a monitor processor 302-2. Here, the command processor 302-1 is configured to process the position command data supplied to the actuator controller 106 to thereby generate and supply the actuator commands, and the monitor processor 302-2 is configured to process the position command data supplied to the actuator controller 106 and to monitor the operability of the command processor 302-1.

The backup actuator controller 118 is configured the same as in FIG. 2, and thus is also coupled to receive the position command data and is configured, upon receipt of the position command data, to selectively generate and supply the actuator commands. Moreover, as with the embodiment depicted in FIG. 2, the backup actuator controller 118 is implemented using a dissimilar backup actuator control processor 304 (e.g., dissimilar microcontroller or FPGA) than is used in the primary actuator controller 116.

The actuator 106 operates the same as in the embodiment of FIG. 1 and is generally configured the same as in the embodiment in FIG. 1. However, there are some differences between this embodiment and the embodiment depicted in FIG. 2. For example, with the actuator 106 in this embodiment the position feedback is supplied from a single motor position sensor 122 and single actuator position sensor 124. Another difference is that the actuator 106 includes a single primary actuator processor 306 and a single primary actuator communication bus 308. However, one similarity is that it includes a backup actuator processor 312 and a backup actuator communication bus 314.

The primary actuator processor 306 is in operable communication with, and is coupled to receive the motor position data from, the motor position sensor 122. The primary actuator processor 306 is also in operable communication with, and is also coupled to receive the actuator position data from, the actuator output position sensor 124. The primary actuator processor 306 is configured to at least process and combine the motor position data and the actuator position data it receives into a single primary sensor data packet.

The backup actuator processor 312 is in operable communication with, and is coupled to receive the motor position data from, the motor position sensor 122. The backup actuator processor 312 is also in operable communication with, and is also coupled to receive the actuator position data from, the actuator output position sensor 124. The backup actuator processor 312 is configured to at least process and combine the motor position data and the actuator position data it receives into a single secondary sensor data packet.

The primary actuator communication bus 308 is in operable communication with the primary actuator processor 306 and with the primary actuator controller 116, and the backup actuator communication bus 314 is in operable communication with the backup actuator processor 312 and with the backup actuator controller 118. The primary actuator communication bus 308 is configured to at least supply the single primary sensor data packet to the primary actuator controller 116, and the backup actuator communication bus 314 is configured to at least supply the single secondary sensor data packet to the backup actuator controller 118. More specifically, the primary actuator communication bus 308 supplies the single primary sensor data packet to the command processor 302-1 (which is monitored by the monitor processor 302-2), and the backup actuator communication bus 314 supplies the single secondary data packet to the backup actuator control processor 304.

As with the embodiment of FIG. 2, it will be appreciated that the primary and backup actuator communication buses 308, 314 can be implemented using any one of numerous types of communication buses. For example, the primary and backup actuator communication buses 308, 314 may be implemented using half duplex bidirectional buses, full duplex bidirectional buses, unidirectional buses with external trigger signals, or unidirectional buses without external trigger signals, just to name a few. The primary and backup actuator communication buses 308, 314 may also use any one of numerous robust communication protocols, such as RS485, RS422, BiSS, or any other suitable communication protocol, rather than using a sensor local bus that could potentially not be suitable for transmitting data over a long distance.

Preferably, the motor position sensor 122 and the actuator position sensor 124 are independently in operable communication with the primary actuator processor 306 via a first type of sensor communication interface 316. The motor position sensor 122 and the actuator position sensor 124 are also preferably independently in operable communication with the backup actuator processor 318 via a second type of sensor communication interface 318. In the depicted embodiment, the first type of communication interface 316 is also the SPI (serial peripheral interface) type, and the second type of communication interface 318 is also the ABI (application binary interface) type or a PWM (pulse width modulation) type. It will be appreciated that various other types of communication interfaces may be used to implement the first and second types of communication interfaces.

The present disclosure significantly reduces the number of interconnections needed between an EMA and its associated EMAC while maintaining redundancy, dissimilarity, and other safety aspects that may be needed by target applications without adding second or third independent redundant position sensors to the EMA for use with backup channel of the controller. This disclosure describes how to extend the sensor architecture used by COM-COM controllers with an additional sensor channel used by a backup controller without the need for adding a separate physical position sensor for the backup controller, which saves implementation effort, space, and weight that would otherwise be needed for integration of additional redundant sensors into the EMA.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like.

The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator control system, comprising:
   a primary actuator controller coupled to receive position command data that is indicative of a commanded position of a component, the primary actuator controller configured, upon receipt of the position command data, to generate and supply actuator commands;
   a backup actuator controller coupled to receive the position command data and configured, upon receipt of the position command data, to generate the actuator commands and to supply the actuator commands only in response to a single-point failure occurring in the primary actuator controller; and
   an actuator in operable communication with the primary actuator controller and the backup actuator controller, the actuator coupled to receive the actuator commands from one of the primary and backup actuator controllers, the actuator configured, upon receipt of the actuator commands, to move the component to the commanded position and to supply feedback data to one of the primary and backup actuator controllers, the actuator including:
   an actuator motor moveable, in response to the actuator commands, to a rotational motor position;
   an actuator output interface coupled to the actuator motor and adapted to be coupled to the component, the actuator output interface moveable, in response to movement of the actuator motor to the rotational position, to an actuator output position;
   a plurality of motor position sensors, each motor position sensor configured to supply motor position data representative of the motor rotational position;
   a plurality of actuator output position sensors, each actuator output position sensor configured to supply actuator position data representative of the actuator output position;
   a plurality of primary actuator processors, each primary actuator processor (i) in operable communication with, and coupled to receive the motor position data from, a different one of the motor position sensors and (ii) in operable communication with, and coupled to receive the actuator position data from, a different one of the actuator output position sensors, each primary actuator processor configured to at least process and combine the motor position data and the actuator position data it receives into a single primary sensor data packet;
   a plurality of primary actuator communication buses, each primary actuator communication bus in operable communication with a different one of the primary actuator processors and with the primary actuator controller, each primary actuator communication bus configured to at least supply the single primary sensor data packet it receives to the primary actuator controller;
   a backup actuator processor (i) in operable communication with, and coupled to receive the motor position data from, at least one of the motor position sensors and (ii) in operable communication with, and coupled to receive the actuator position data from, at least one of the actuator output position sensors, the backup actuator processor configured to at least process and combine the motor position data and the actuator position data it receives into a single secondary sensor data packet, and a backup actuator communication bus in operable communication with the backup actuator processor and with the backup actuator controller, the backup actuator communication bus configured to at least supply the single secondary sensor data packet it receives to the backup actuator controller.

2. The actuator of claim 1, wherein:

the plurality of motor position sensors includes a first motor position sensor and a second motor position sensor;

the plurality of actuator position sensors includes a first actuator position sensor and a second actuator position sensor; and the plurality of primary actuator processors includes a first primary actuator processor and a second primary actuator processor.

3. The system of claim 2, wherein:

the first motor position sensor is in operable communication with the first primary actuator processor;

the second motor position sensor is in operable communication with the second primary actuator processor;

the first actuator position sensor is in operable communication with the first primary actuator processor;

the second actuator position sensor is in operable communication with the second primary actuator processor.

4. The system of claim 3, wherein:

at least one of the first motor position sensor and the second motor position sensor are in operable communication with the backup actuator processor; and at least one of the first actuator position sensor and the second actuator position sensor are in operable communication with the backup actuator processor.

5. The system of claim 4, wherein:

the first and second motor position sensors are in operable communication with the first and second primary actuator processors, respectively, via a first type of sensor communication interface;

the first and second actuator position sensors are in operable communication with the first and second primary actuator processors, respectively, via the first type of sensor communication interface;

the at least one of the first motor position sensor and the second motor position sensor are in operable communication with the backup actuator processor via a second type of sensor communication interface; and the at least one of the first actuator position sensor and the second actuator position sensor are in operable communication with the backup actuator processor via the second type of sensor communication interface.

6. The actuator of claim 1, further comprising:

a first printed circuit board having mounted thereon the first primary actuator processor, the first motor position sensor, and the second motor position sensor; and a second printed circuit board having mounted thereon the second primary actuator processor, the first actuator position sensor, and the second actuator position sensor.

7. The actuator of claim 6, wherein the backup actuator processor is mounted on one of the first printed circuit board or the second printed circuit board or on a third printed circuit board.

8. The system of claim 1, wherein the primary actuator controller comprises:

a plurality of actuator control processors, each actuator control processor in operable communication with a different one of the actuator communication buses and configured to supply the actuator position commands to one of the actuator processors via its actuator communication interface.

9. The system of claim 1, wherein the actuator communication interfaces are implemented using dissimilar communication protocols.

10. An aircraft fly-by-wire flight control system, comprising:

a flight control inceptor configured to receive user input from a user and configured, in response to the user input, to supply inceptor command data;

a flight control computer in operable communication with the flight control inceptor, the flight control computer coupled to receive the inceptor command data from the flight control inceptor and configured, upon receipt of the inceptor data, to generate and supply flight control surface position command data;

a flight control surface actuator controller in operable communication with the flight control computer, the flight control surface actuator controller comprising a primary actuator controller and a backup actuator controller, the primary actuator controller coupled to receive the flight control surface position command data and configured, upon receipt of the flight control surface position command data, to generate and supply flight control surface actuator commands, the backup actuator controller coupled to receive the flight control surface position command data and configured, upon receipt of the flight control surface position command data, to generate the actuator commands and to supply the actuator commands only in response to a single-point failure occurring in the primary actuator controller; and a flight control surface actuator in operable communication with the flight control surface actuator controller, the flight control surface actuator coupled to receive the flight control surface position commands from one of the primary and backup actuator controllers, the flight control surface actuator configured, upon receipt of the flight control surface position commands, to move a flight control surface to the commanded position and to supply feedback data to the flight control surface actuator controller, the flight control surface actuator including:

an actuator motor moveable, in response to the actuator commands, to a rotational motor position;

an actuator output interface coupled to the actuator motor and adapted to be coupled to the flight control surface, the actuator output interface moveable, in response to movement of the actuator motor to the rotational position, to an actuator output position;

a plurality of motor position sensors, each motor position sensor configured to supply motor position data representative of the motor rotational position;

a plurality of actuator output position sensors, each actuator output position sensor configured to supply actuator position data representative of the actuator output position;

a plurality of primary actuator processors, each primary actuator processor (i) in operable communication with, and coupled to receive the motor position data from, a different one of the motor position sensors and (ii) in operable communication with, and coupled to receive the actuator position data from, a different one of the actuator output position sensors, each primary actuator processor configured to at least process and combine the motor position data and the actuator position data it receives into a single primary sensor data packet;

a plurality of primary actuator communication buses, each primary actuator communication bus in operable communication with a different one of the primary actuator processors and with the primary actuator controller, each primary actuator communication bus configured to at least supply the single primary sensor data packet it receives to the primary actuator controller;

a backup actuator processor (i) in operable communication with, and coupled to receive the motor position data from, at least one of the motor position sensors and (ii) in operable communication with, and coupled to receive the actuator position data from, at least one of the actuator output position sensors, the backup actuator processor configured to at least process and combine the motor position data and the actuator position data it receives into a single secondary sensor data packet, and a backup actuator communication bus in operable communication with the backup actuator processor and with the backup actuator controller, the backup actuator communication bus configured to at least supply the single secondary sensor data packet it receives to the backup actuator controller.

11. The aircraft fly-by-wire flight control system of claim 10, wherein:

the plurality of motor position sensors includes a first motor position sensor and a second motor position sensor;

the plurality of actuator position sensors includes a first actuator position sensor and a second actuator position sensor; and the plurality of primary actuator processors includes a first primary actuator processor and a second primary actuator processor.

12. The aircraft fly-by-wire flight control system of claim 11, wherein:

the first motor position sensor is in operable communication with the first primary actuator processor;

the second motor position sensor is in operable communication with the second primary actuator processor;

the first actuator position sensor is in operable communication with the first primary actuator processor;

the second actuator position sensor is in operable communication with the second primary actuator processor.

13. The aircraft fly-by-wire flight control system of claim 12, wherein:

at least one of the first motor position sensor and the second motor position sensor are in operable communication with the backup actuator processor; and at least one of the first actuator position sensor and the second actuator position sensor are in operable communication with the backup actuator processor.

14. The aircraft fly-by-wire flight control system of claim 13, wherein:

the first and second motor position sensors are in operable communication with the first and second primary actuator processors, respectively, via a first type of sensor communication interface;

the first and second actuator position sensors are in operable communication with the first and second primary actuator processors, respectively, via the first type of sensor communication interface;

the at least one of the first motor position sensor and the second motor position sensor are in operable communication with the backup actuator processor via a second type of sensor communication interface; and the at least one of the first actuator position sensor and the second actuator position sensor are in operable communication with the backup actuator processor via the second type of sensor communication interface.

15. The aircraft fly-by-wire flight control system of claim 10, further comprising:

a first printed circuit board having mounted thereon the first primary actuator processor, the first motor position sensor, and the second motor position sensor; and a second printed circuit board having mounted thereon the second primary actuator processor, the first actuator position sensor, and the second actuator position sensor.

16. The aircraft fly-by-wire flight control system of claim 15, wherein the backup actuator processor is mounted on one of the first printed circuit board or the second printed circuit board or on a third printed circuit board.

17. The aircraft fly-by-wire flight control system of claim 10, wherein the primary actuator controller comprises:

a plurality of actuator control processors, each actuator control processor in operable communication with a different one of the actuator communication buses and configured to supply the actuator position commands to one of the actuator processors via its actuator communication interface.

18. The aircraft fly-by-wire flight control system of claim 10, wherein the actuator communication interfaces are implemented using dissimilar communication protocols.

19. An actuator control system, comprising:

a primary actuator controller coupled to receive position command data that is indicative of a commanded position of a component, the primary actuator controller including a command processor and a monitor processor, the command processor configured to process the position command data to thereby generate and supply actuator commands, the monitor processor configured to monitor operability of the command processor;

a backup actuator controller coupled to receive the position command data and configured, upon receipt of the position command data, to generate the actuator commands and to supply the actuator commands only in response to a single-point failure occurring in the primary actuator controller; and an actuator in operable communication with the primary actuator controller and the backup actuator controller, the actuator coupled to receive the actuator commands from one of the primary and backup actuator controllers, the actuator configured, upon receipt of the actuator commands, to move the component to the commanded position and to supply feedback data to one of the primary and backup actuator controllers, the actuator including:

an actuator motor moveable, in response to the actuator commands, to a rotational motor position;

an actuator output interface coupled to the actuator motor and adapted to be coupled to the component, the actuator output interface moveable, in response to movement of the actuator motor to the rotational position, to an actuator output position;

a motor position sensor configured to supply motor position data representative of the rotational motor position;

an actuator output position sensor configured to supply actuator position data representative of the actuator output position;

a primary actuator processor in operable communication with the motor position sensor and the actuator output position sensor, the primary actuator processor coupled to receive the motor position data and the actuator position data and configured to at least process and combine the motor position data and the actuator position data into a single primary sensor data packet;

a primary actuator communication bus in operable communication with the primary actuator processor and with the primary actuator controller, the primary actuator communication bus configured to at least supply the single primary sensor data packet to the primary actuator controller;

a backup actuator processor in operable communication with the motor position sensor and the actuator output position sensor, the backup actuator processor coupled to receive the motor position data and the actuator position data and configured to at least process and combine the motor position data and the actuator position data into a single backup sensor data packet; and a backup actuator communication bus in operable communication with the backup actuator process and the backup actuator controller, the backup actuator communication bus configured to at least supply the single secondary sensor data packet to the backup actuator controller.

20. The system of claim 19, wherein:

the motor position sensor is in operable communication with the primary actuator processor via a first type of sensor communication interface and is in operable communication with the backup actuator processor via a second type of sensor communication interface; and the actuator position sensor is in operable communication with the primary actuator processors via the first type of sensor communication interface and is in operable communication with the backup actuator processor via the second type of sensor communication interface.

* * * * *